US006632876B2

(12) United States Patent
Soukatchoff

(10) Patent No.: US 6,632,876 B2
(45) Date of Patent: *Oct. 14, 2003

(54) PRODUCT FOR COATING THE INTERNAL SURFACE OF A CONDUIT, METHOD AND MACHINE USING SAME AND CONDUIT COATED WITH SAME

(75) Inventor: Pascal Soukatchoff, Saint Christophe (FR)

(73) Assignee: Pont-A-Mousson S.A., Nancy (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/319,543

(22) PCT Filed: Oct. 9, 1998

(86) PCT No.: PCT/FR98/02173
§ 371 (c)(1),
(2), (4) Date: Jun. 9, 1999

(87) PCT Pub. No.: WO99/19660
PCT Pub. Date: Apr. 22, 1999

(65) Prior Publication Data
US 2002/0047106 A1 Apr. 25, 2002

(30) Foreign Application Priority Data
Oct. 10, 1997 (FR) .............................. 97 12706

(51) Int. Cl.$^7$ ................................ C08K 3/00
(52) U.S. Cl. ................. 524/650; 106/600; 106/624; 106/705
(58) Field of Search ................ 524/650; 106/600, 106/624, 705

(56) References Cited

U.S. PATENT DOCUMENTS

| 3,639,276 | A | * | 2/1972 | Mueller ........................ 252/62 |
| 3,986,996 | A | * | 10/1976 | Villa ............................ 260/28 |
| 4,011,195 | A | * | 3/1977 | Self ............................. 260/40 |
| 4,013,614 | A | * | 3/1977 | Self ............................. 260/40 |
| 4,224,169 | A | * | 9/1980 | Retana ........................ 252/8.1 |
| 4,352,390 | A | * | 10/1982 | Larson ........................ 164/351 |
| 4,500,674 | A | | 2/1985 | Fontana et al. ............. 524/650 |
| 4,613,632 | A | * | 9/1986 | Aliani ......................... 523/172 |
| 4,676,953 | A | * | 6/1987 | Jeromin ...................... 422/106 |
| 4,717,422 | A | * | 1/1988 | Perfetti ........................ 106/19 |
| 5,238,668 | A | * | 8/1993 | Novotny ..................... 423/333 |
| 5,244,304 | A | * | 9/1993 | Weill ........................... 404/67 |
| 5,607,503 | A | * | 3/1997 | Burr ....................... 106/287.11 |

FOREIGN PATENT DOCUMENTS

DE 41 37 566 A1 5/1993

* cited by examiner

*Primary Examiner*—Edward J. Cain
(74) *Attorney, Agent, or Firm*—Wenderoth, Lind & Ponack, L.L.P.

(57) ABSTRACT

The invention relates to a product for the internal coating of a pipeline component (1), in particular a metal pipeline component, comprising an internal wall (4) of high curvature. This product comprises a solid charge and a liquid. The liquid is a solution of an alkali metal silicate and the solid charge comprises sand, between 20 and 30% by mass of a binder which sets chemically by reaction with the liquid, and between 4 and 10% by mass of plasticizing adjuvants. The solid charge and the liquid are intended to be mixed (in 5) with a liquid/binder ratio by mass of between approximately 0.3 and 0.45.

Application to pipelines for discharge of waste water made of spheroidal graphite cast iron.

25 Claims, 2 Drawing Sheets

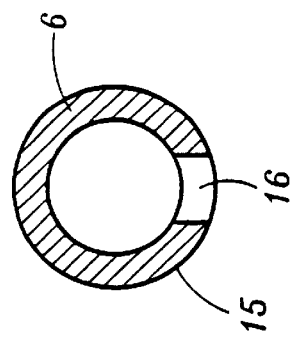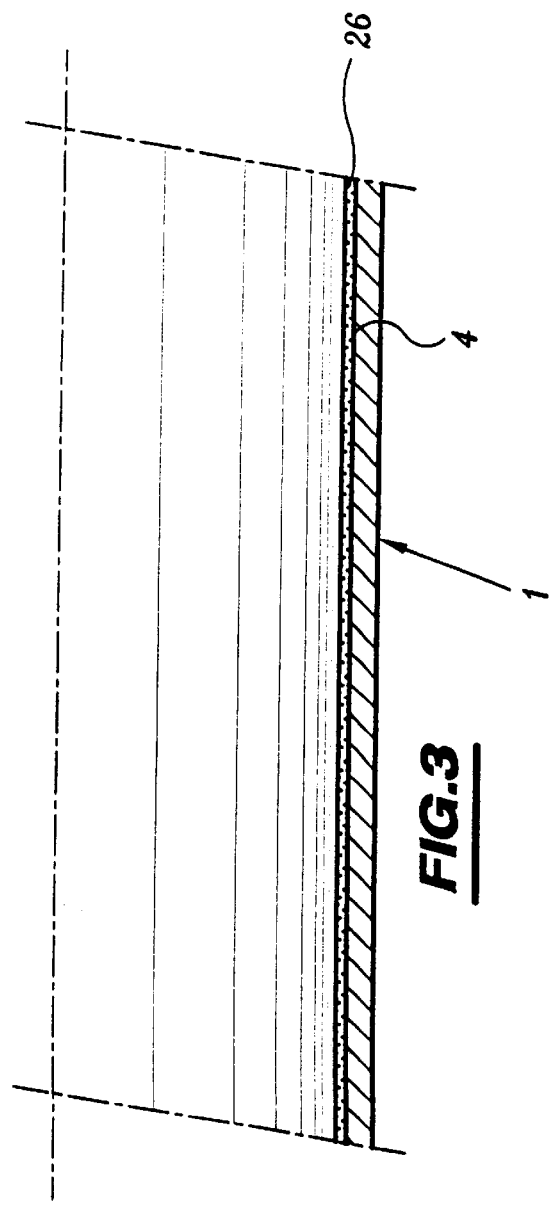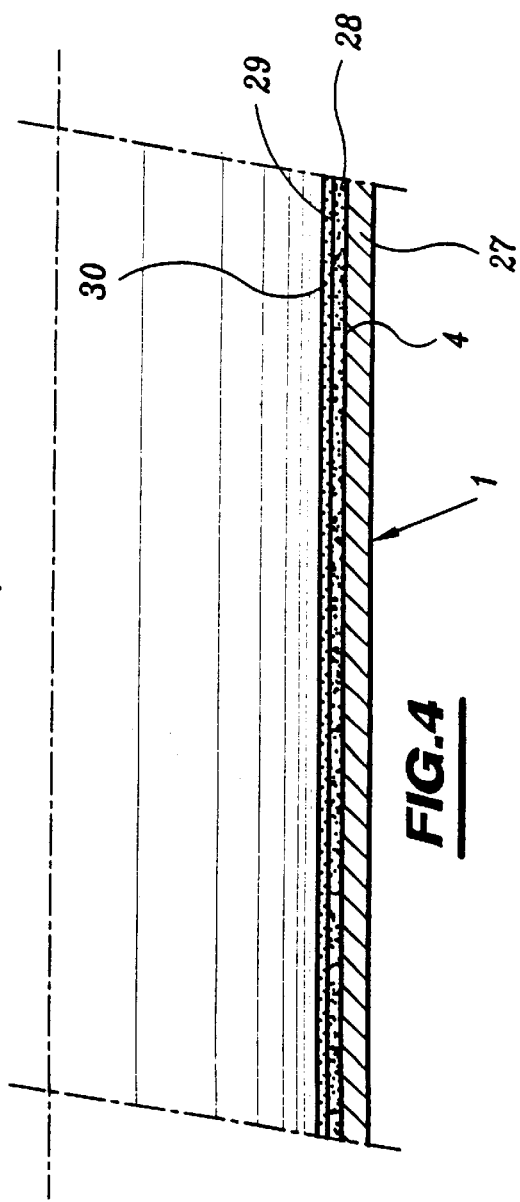

PRODUCT FOR COATING THE INTERNAL SURFACE OF A CONDUIT, METHOD AND MACHINE USING SAME AND CONDUIT COATED WITH SAME

This application is a U.S. national stage of International Application No. PCT/FR98/02173 filed Oct. 9, 1998.

BACKGROUND OF THE INVENTION

1. Field of the Invention

The present invention relates to a product for the internal coating of a pipeline component, in particular a metal pipeline component, comprising an internal wall of high curvature.

The present invention applies more particularly to pipelines for discharge of waste water made of spheroidal graphite cast iron.

2. Description of the Related Art

Such pipelines transport particularly aggressive media which can result, in particular in hot countries, in the development in these pipelines of corrosion of bacterial origin, for example of sulphuric type or more generally of acid type.

In order to limit the effects of such corrosion, various types of internal coating for the protection of pipeline components are used. Thus, use is made, for example, of coatings obtained by curing mortars, in particular mortars based on high-alumina cement, or epoxy-based paints.

The aim of the invention is to provide a particularly effective coating which can be used industrially an economical way for the purposes of protecting from corrosion pipeline components comprising an internal wall of high curvature.

SUMMARY OF THE INVENTION

To this end, the subject-matter of the invention is a product for the internal coating of a pipeline component, in particular a metal pipeline component, comprising an internal wall of high curvature, characterized in that it comprises a solid charge and a liquid, the liquid being a solution of an alkali metal silicate and the solid charge comprising sand, between 20 and 30% by mass of a binder which sets chemically by reaction with the liquid, and between 4 and 10% by mass of plasticizing adjuvants, the solid charge and the liquid being intended to be mixed with a liquid/binder ratio by mass of between approximately 0.35 and 0.45.

According to specific embodiments, the coating product can comprise one or more of the following characteristics:

the solid charge comprises by mass, as plasticizing adjuvant, between 2 and 7% of fine silica, in particular with a particle size of less than 100 $\mu$m;

the solid charge comprises by mass, as plasticizing adjuvant, between 0.4 and 0.6% of tripolyphosphate;

the solid charge also comprises, as plasticizing adjuvants, neopentyl glycol at less than 1% by mass and/or copper acetate at less than 0.5% by mass; and the binder comprises, by mass, approximately 10% of fumed silica and 90% of fly ash and the liquid is a potassium silicate solution.

Another subject-matter of the invention is a process for the internal coating of a pipeline component, in particular a metal pipeline component, comprising an internal wall of high curvature, starting with a coating product as defined above, characterized in that:

the solid charge and the liquid of the product are mixed with a liquid/binder of the solid charge ratio by mass of approximately 0.35 to 0.45, in order to obtain a substantially homogeneous pasty mixture, the mixture obtained is deposited in a substantially uniform way over the internal wall of the said pipeline component, and the deposited mixture is allowed to cure, in particular by heating the pipeline component, in order to form a main internal coating.

According to specific embodiments, the process can comprise one or more of the following characteristics:

the pipeline component being substantially cylindrical with a circular base, the pipeline component is rotated about its axis in order to compact the deposit by centrifuging, the said compacting by centrifuging is carried out after the said deposition of the mixture on the said internal wall, the pipeline component being substantially cylindrical with a circular base, the mixture obtained is deposited on the internal wall of the pipeline component by extrusion using a nozzle and by helical relative movement of the nozzle with respect to the internal wall, in order to form a helical deposit of the mixture on the said internal wall, and the rotational speed of the pipe during the compacting by centrifuging is much higher than the rotational speed of the pipe during the deposition of the mixture.

Another subject-matter of the invention is a pipeline component, in particular a metal pipeline component, comprising an internal wall of high curvature coated internally with an internal coating obtained by a process as defined above, characterized in that the thickness of the main internal coating is between approximately 1.5 and 15 mm.

Another subject-matter of the invention is a pipeline component comprising a pipe, in particular a metal pipe, coated internally with an intermediate coating obtained by curing a mortar, in particular a mortar based on high-alumina cement, delimiting an internal wall of high curvature, this wall being coated with a main internal coating obtained by a process as defined above, characterized in that the thickness of the main coating is between approximately 1.5 and 8 mm.

The pipeline component can be cylindrical with a circular base and its internal diameter can be between approximately 40 and 2000 mm.

A final subject-matter of the invention is a machine for depositing a pasty mixture on an internal wall of a substantially cylindrical pipeline component with a circular base, in particular for the implementation of a process as defined above, characterized in that it comprises an extrusion nozzle, exhibiting a feed orifice and a front oblong outlet opening, a mixer equipped with means for feeding with solid charge and with liquid in order to form the mixture, means for connecting the mixer to the feed orifice of the nozzle which are equipped with pumping means, means or supporting the nozzle in order to position the opening substantially parallel to the axis of the pipeline component and close to the internal wall of the pipeline component, and means for helical relative movement of the oblong opening with respect to the internal wall.

The invention will be better understood on reading the description which follows, given solely by way of example and made with reference to the appended drawings, in which:

BRIEF DESCRIPTION OF THE DRAWINGS

FIG. 2 is an expanded cross-sectional view along the line II—II of the extrusion nozzle in FIG. 1, FIG. 3 is a partial half-view in longitudinal section illustrating a pipeline component according to the invention, and FIG. 4 is a view analogous to FIG. 3 illustrating another pipeline component according to the invention.

DESCRIPTION OF THE PREFERRED EMBODIMENTS

Figure 1:
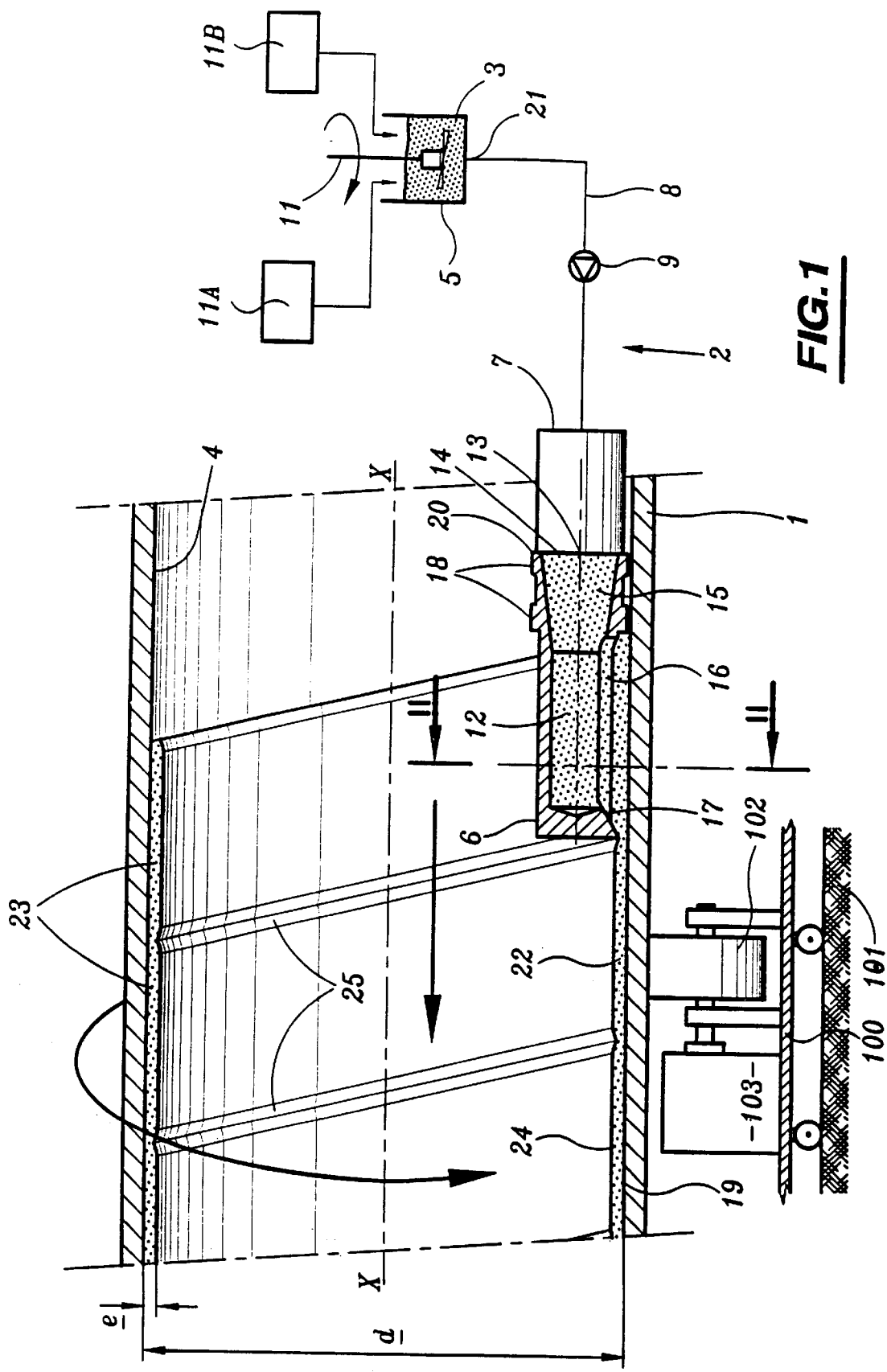
FIG. 1 is a partial lateral diagrammatic view illustrating a process for the internal coating of a pipeline component according to the invention, the pipeline component being partially represented in longitudinal section.

FIG. 1 represents a pipeline component or pipe made of spheroidal graphite cast iron 1 intended to be used for the discharge of waste water, and a machine 2 for depositing a pasty mixture 3 on the internal wall 4 of the pipe.

The internal diameter d of the pipe 1, of between 40 and 2000 mm approximately, is typically approximately 1000 mm, and the wall 4 is thus of high curvature.

The machine 2 essentially comprises a mixer 5 of the type of those used to prepare cement-based mortars, a nozzle 6 for extrusion of the mixture 3, means 7 for supporting the nozzle 6, a line 8 for conveying the mixture 3 to the nozzle 6 equipped with a pump 9, and means for helical movement of the pipe 1 with respect to the nozzle 6. These conventional means can comprise a trolley 100, movable longitudinally on the stationary supporting member 101 of the machine, equipped with means for holding the pipe, including rollers 102 coupled to a motor 103 in order to drive the pipe 1 in rotation about its axis.

The mixer 5 is equipped with stirring means and with means for feeding with solid charge 11A and with liquid 11B.

As illustrated in FIGS. 1 and 2, the nozzle 6 is a metal part of cylindrical general shape positioned with its axis substantially parallel to the X—X axis of the pipe 1.

This nozzle 6 is traversed by a channel 12 emerging, on the one hand, in a longitudinal rear face 13 of the nozzle 6, via a substantially circular orifice 14 and a convergent pipe 15 for feeding the nozzle 6, and, on the other hand, laterally, via a front slot 16 (on the left in FIG. 1) for exiting from the nozzle 6. This slot 16 has a longitudinal axis substantially parallel to the axis of the nozzle 6.

As seen in FIG. 1, a front edge 17 of the nozzle 6, partially delimiting the slot 16, is inclined radially towards the outside and towards the front of the nozzle, so that the slot 16 splays outwards.

The nozzle 6 is equipped at the rear of the slot 16 (on the right in FIG. 1) with two annular flanges 18 coaxial with the nozzle 6. These flanges 18, with the same radial thickness, are offset with respect to one another. The flanges 18 are situated a short distance from a generator 19 of the wall 4 of the pipe 1. The nozzle 6 is directed so that the slot 16 faces the generator 19. The slot 16 is separated from the wall 4 by a predetermined distance.

The area of the outlet cross-section of the slot 16 corresponds substantially to the area of the cross-section of the orifice 14 of the nozzle 6.

The support means 7 are of conventional type for the person skilled in the art and are connected to the rear end 20 of the nozzle 6. These support means 7 are adapted in order to fix, on the one hand, the radial position of the nozzle 6 with respect to the wall 4 and the distance between the slot 16 and the wall 4, as described above, and, on the other hand, the position of the nozzle 6 with respect to the stationary supporting member 101 of the machine.

The line 8 is connected, on the one hand, to the feed orifice 14 of the nozzle 6 and, on the other hand, to an outlet 21 of the mixer 5.

The means for moving the pipe 1 with respect to the nozzle 6 are adapted, on the one hand, so that the pipe 1 can move parallel to its axis at an adjustable constant rate r and, on the other hand, so that the pipe can rotate, simultaneously or otherwise with this axial movement, about its axis at an adjustable constant rate $\omega$.

The pasty mixture 3 is obtained by mixing a product comprising a solid charge and a liquid.

The liquid is a potassium silicate solution with a relative density typically of approximately 1.43, more generally between 1.4 and 1.5, and containing approximately 40% of dry matter.

The solid charge comprises siliceous sand, a binder which sets chemically by reaction with the liquid, plasticizing adjuvants and glass fibres.

The solid charge comprises approximately 23% by mass of chemical binder, with a particle size of less than 80 $\mu$m, composed of approximately 90% by mass of fly ash and of approximately 10% by mass of fumed silica.

The solid charge also comprises four plasticizing adjuvants. The first plasticizing adjuvant is fine silica (with a particle size of less than 100 $\mu$m and with a mean diameter of between approximately 10 and 25 $\mu$m) and represents approximately 5% by mass of the solid charge. The second adjuvant is tripolyphosphate and represents approximately 0.4% by mass of the solid charge.

The third and fourth plasticizing adjuvants, which are auxiliary adjuvants together representing less than 1.5% by mass of the main solid charge, are composed respectively of neopentyl glycol and of copper acetate.

The remainder of the solid charge is siliceous sand with a particle size of between 80 $\mu$m and 800 $\mu$m, to which has been added a small amount of glass fibres, typically of the order of 0.5% by mass.

The solid charge and the liquid are introduced into the mixer 5 with a liquid/binder ratio by mass of approximately 40%, that is to say with a liquid/solid charge ratio by mass of approximately 0.09.

The solid charge and the liquid are mixed by the mixer 5 for several minutes in order to obtain a substantially homogeneous mixture 3.

The mixture 3 is subsequently conveyed to the nozzle 6, through the line 8, via the pump 9.

This mixture 3 is deposited on the wall 4 by extrusion through the nozzle 6.

The means for moving the pipe 1 simultaneously provide a movement of the pipe 1 parallel to its axis and a rotation of the pipe 1 about its axis (as shown diagrammatically by arrows in FIG. 1), so that the slot 16 describes a helical movement with respect to the wall 4 while remaining at a constant distance from the latter and with its longitudinal axis parallel to the axis of the pipe 4.

The relative movements and position of the slot 16 and of the wall 4 result, by an appropriate adjustment of the rates r and $\omega$, in the formation of a deposit 22 of the mixture 3 on the wall 4 in the shape of a helical ribbon.

The thickness e of the ribbon 22 corresponds substantially to the distance between the slot 16 and the wall 4 and thus to the radial extent of the flanges 18. It is preferably between 1.5 and 15 mm.

The rates r and $\omega$ are adjusted so that the successive turns 23 of the deposit 22 are contiguous. The internal surface 24 of the deposit 22 exhibits a helical groove 25 corresponding to the junction of the successive turns 23.

After having deposited the mixture 3 on the wall 4 as described above, the nozzle 6 is withdrawn from the pipe 1 and then the latter is rotated about its axis by virtue of the means for movement of the pipe 1. This operation makes it possible, by centrifuging, to compact the deposit 22 and to smooth the surface 24, causing in particular the disappearance of the groove 25. The deposit 22 is preferably centrifuged with an acceleration greater than 60 g, for example of approximately 100 g. The rotational speed of the pipe 1 during the centrifuging is much greater than the rotational speed of the pipe 1 during the deposition of the mixture 3.

The pipe 1 is subsequently sealed at its longitudinal ends in order to accelerate the curing of the deposited mixture 3, the pipe 4 being placed in an oven and being heated at between approximately 30 and 110° C., preferably between 30 and 50° C. For this latter temperature range, the time necessary for heating can reach approximately 10 hours and, for higher temperatures, the time necessary for heating can reach approximately 1 hour.

The setting and curing reaction is an exothermic chemical reaction which involves, on the one hand, the potassium silicate of the liquid and, on the other hand, the aluminosilicates and the silica of the solid charge (in particular of the binder). A glass is then formed composed essentially of a three-dimensional lattice of $SiO_4$ and $AlO_4$ tetrahedra. The $K^+$ ions are found in the spaces in the lattice and allow electrical balancing of the glass.

The coating 26 (FIG. 3) obtained by curing the deposit 22 is uniform and exhibits very good adhesion to the wall 4, in particular better adhesion than that of the coatings obtained by curing cement-based mortars. This coating 26 also exhibits very good resistance to ovalization and to impacts and its porosity is lower than that of coatings obtained by curing cement-based mortars. The porosity of the coating 26 is in particular decreased by virtue of the centrifuging, described above, of the deposit 22. The thickness of the coating 26 obtained corresponds substantially to the thickness e of the deposit 22.

Furthermore, this coating 26 exhibits very good resistance to corrosion in acid medium.

For its part, the mixture 3 obtained exhibits good processing characteristics. Thus, the time during which this mixture can be processed is approximately 4 hours, that is to say that it can flow for up to approximately 4 hours between the time at which the solid charge and the liquid of the product begin to be mixed and the time at which the mixture obtained, kept stirring, is applied to the wall to be coated. Furthermore, the deposit 22 exhibits good adhesion to the wall 4 to be coated and it can thus be employed industrially on walls of high curvature, in particular on the internal walls of pipes with internal diameters of between 40 and 2000 mm.

More generally, the solid charge of the produce used to obtain the mixture 3 can comprise between 2 and 7% by mass of fine silica, between 0.4 and 0.6% by mass of tripolyphosphate, up to 1% by mass of neopentyl glycol, up to 0.5% by mass of copper acetate and between 20 and 30% by mass of binder, the remainder of the solid charge being mainly composed of siliceous sand and of a small amount of glass fibres.

The liquid/binder ratio by mass for obtaining the mixture 3 is preferably between 0.35 and 0.45.

Of course, the helical relative movement of the nozzle 6 and of the pipe 1 can also be obtained by rotating the pipe 1 about its axis and by moving the nozzle 6 parallel to the axis of the pipe 1, for example using a telescopic arm.

The mixture 3 can also be deposited on the wall 4 using a turbine.

FIG. 4 illustrates the use of the internal coating product for a pipeline component 1 comprising a pipe made of spheroidal graphite cast iron 27, the internal wall 4 of which has been conventionally coated beforehand with an intermediate coating 28 obtained by curing a mortar based on high-alumina cement. By using a process analogous to that described with respect to FIG. 1, the mixture 3 obtained from the coating product was deposited on the internal wall 29, of high curvature, of the intermediate coating 28 and then the curing of this deposited mixture 3 resulted in the formation of a main coating 30 internally covering the intermediate coating 28.

The thickness of the main coating 30 is preferably between approximately 1.5 and 8 mm.

The coating 30 exhibits good adhesion to the intermediate coating 28, good impact strength and a Low porosity, and it offers, with the intermediate coating 28, good resistance to ovalization and very good resistance to acid corrosion.

What is claimed is:

1. A product comprising (a) a liquid which is a solution of an alkali metal silicate and (b) a solid charge comprising (i) sand, (ii) a binder, in an amount between 20 and 30% by mass, which sets chemically by reaction with said liquid, and (iii) a plurality of plasticizing adjuvants in an amount between 4 and 10% by mass, said liquid and solid charge being separated from one another, wherein said liquid and solid charge is to be mixed at a liquid/binder ratio by mass of between approximately 0.35 and 0.45 for the internal coating of a pipeline component.

2. The product according to claim 1, wherein the solid charge comprises by mass between 2 and 7% of fine silica as one of said plasticizing adjuvants.

3. The product according to claim 2, wherein the fine silica comprises a particle size of less than 100 µm.

4. The product according to claim 1, wherein the solid charge comprises by mass between 0.4 and 0.6% of tripolyphosphate as one of said plasticizing adjuvants.

5. The product according to claim 1, wherein the solid charge comprises, as plasticizing adjuvants, neopentyl glycol at less than 1% by mass and/or copper acetate at less than 0.5% by mass.

6. The product according to claim 1, wherein the binder comprises by mass approximately 10% of fumed silica and 90% of fly ash, and wherein the liquid is a potassium silicate solution.

7. The product according to claim 1, which is used for the internal coating of a pipeline component comprising an internal wall of high curvature.

8. The product according to claim 7, wherein the pipeline component is a metal pipeline component.

9. A process for the internal coating of a pipeline component comprising an internal wall of high curvature, said process comprising:

mixing a liquid and a solid charge at a liquid/binder ratio by mass of approximately 0.35 to 0.45, to obtain a substantially homogeneous pasty mixture, said liquid being a solution of an alkali metal silicate and said solid charge comprising (i) sand, (ii) a binder, in an amount between 20 and 30% by mass, which sets chemically by reaction with said liquid, and (iii) a plurality of plasticizing adjuvants in an amount between 4 and 10% by mass, depositing said mixture in a substantially uniform way on said internal wall of the said pipeline component, and curing the deposited mixture to form said internal coating.

10. The process according to claim 9, wherein the deposited mixture is cured by heating said pipeline component.

11. The process according to claim 9, wherein the pipeline component is a metal pipeline component.

12. The process according to claim 9, wherein the pipeline component is substantially cylindrical with a circular base.

13. The process according to claim 12, further comprising rotating said pipeline component about its axis to compact said deposited mixture by centrifugation.

14. The process according to claim 13, wherein said pipeline component is rotated about its axis to compact said deposited mixture by centrifugation after deposition of said mixture on said internal wall is completed.

15. The process according to claim 12, wherein said mixture is deposited on said internal wall of said pipeline component by extrusion using a nozzle and by helical relative movement of said nozzle with respect to said internal wall to form a helical deposit of said mixture on said internal wall.

16. The process according to claim 15, further comprising (i) rotating said pipeline component about its axis during deposition of said mixture and (ii) rotating said pipeline component about its axis to compact said deposited mixture by centrifugation after deposition of said mixture on said internal wall is completed, wherein said pipeline component is rotated at a higher speed during said compact of said deposited mixture by centrifugation than during said deposit of said mixture.

17. A pipe comprising an internal wall of high curvature coated internally with an internal coating, said internal coating being obtained by the process according to claim 9, and having a thickness of between approximately 1.5 and 15 mm.

18. The pipe according to claim 17, wherein the pipe is a metal pipe.

19. A pipeline component comprising a pipe coated internally with an intermediate coating obtained by curing a mortar, delimiting an internal wall of high curvature, said internal wall being coated with an internal coating obtained by the process according to claim 9, said internal coating having a thickness of between approximately 1.5 and 8 mm.

20. The pipeline component according to claim 19, wherein the pipe is a metal pipe.

21. The pipeline component according to claim 19, wherein the mortar is based on high-alumina cement.

22. The pipe according to claim 17, wherein the pipe is cylindrical with a circular base and has an internal diameter of between approximately 40 and 2000 mm.

23. The pipeline component according to claim 19, wherein the pipe is cylindrical with a circular base and has an internal diameter of between approximately 40 and 2000 mm.

24. The pipe according to claim 17, wherein the internal coating comprises a three-dimensional lattice of $SiO_4$ and $AlO_4$ tetrahedra.

25. The pipeline component according to claim 19, wherein the internal coating comprises a three-dimensional lattice of $SiO_4$ and $AlO_4$ tetrahedra.

* * * * *